United States Patent
Meyerstein et al.

(10) Patent No.: US 8,812,836 B2
(45) Date of Patent: Aug. 19, 2014

(54) SECURE REMOTE SUBSCRIPTION MANAGEMENT

(75) Inventors: Michael V. Meyerstein, Ipswich (GB); Yogendra C. Shah, Exton, PA (US); Inhyok Cha, Yardley, PA (US); Andreas Leicher, Frankfurt (DE); Andreas U. Schmidt, Frankfurt (DE)

(73) Assignee: InterDigital Patent Holdings, Inc., Wilmington, DE (US)

( * ) Notice: Subject to any disclaimer, the term of this patent is extended or adjusted under 35 U.S.C. 154(b) by 372 days.

(21) Appl. No.: 12/718,853

(22) Filed: Mar. 5, 2010

(65) Prior Publication Data

US 2011/0035584 A1 Feb. 10, 2011

Related U.S. Application Data

(60) Provisional application No. 61/157,796, filed on Mar. 5, 2009.

(51) Int. Cl.
*H04L 29/06* (2006.01)
*H04W 8/26* (2009.01)
*H04W 12/06* (2009.01)

(52) U.S. Cl.
CPC .............. *H04W 8/265* (2013.01); *H04W 12/06* (2013.01)
USPC .......................................... 713/155; 713/168

(58) Field of Classification Search
CPC ...... H04W 12/04; H04W 12/06; H04W 8/265
USPC .......................................... 713/155–163, 168
See application file for complete search history.

(56) References Cited

U.S. PATENT DOCUMENTS

| | | | |
|---|---|---|---|
| 7,934,094 B2 * | 4/2011 | Oyama ......................... | 713/168 |
| 7,983,418 B2 * | 7/2011 | Oyama et al. ................ | 380/248 |
| 2004/0073797 A1 * | 4/2004 | Fascenda ..................... | 713/171 |
| 2006/0185013 A1 * | 8/2006 | Oyama et al. ................ | 726/21 |
| 2007/0124592 A1 * | 5/2007 | Oyama ......................... | 713/171 |
| 2008/0076420 A1 * | 3/2008 | Khetawat et al. .......... | 455/435.1 |
| 2008/0132226 A1 * | 6/2008 | Carnall ......................... | 455/425 |
| 2008/0273704 A1 * | 11/2008 | Norrman et al. ............. | 380/278 |
| 2008/0305792 A1 * | 12/2008 | Khetawat et al. .......... | 455/435.1 |
| 2009/0041247 A1 * | 2/2009 | Barany et al. ................ | 380/270 |

(Continued)

OTHER PUBLICATIONS

PCT Application No. PCT/US2010/026404 : International Preliminary Report on Patentability, Mar. 18, 2011, 14 pages.

(Continued)

*Primary Examiner* — Chau Le
*Assistant Examiner* — Don Zhao
(74) *Attorney, Agent, or Firm* — Baker & Hostetler LLP

(57) ABSTRACT

A method and apparatus are disclosed for performing secure remote subscription management. Secure remote subscription management may include providing the Wireless Transmit/Receive Unit (WTRU) with a connectivity identifier, such as a Provisional Connectivity Identifier (PCID), which may be used to establish an initial network connection to an Initial Connectivity Operator (ICO) for initial secure remote registration, provisioning, and activation. A connection to the ICO may be used to remotely provision the WTRU with credentials associated with the Selected Home Operator (SHO). A credential, such as a cryptographic keyset, which may be included in the Trusted Physical Unit (TPU), may be allocated to the SHO and may be activated. The WTRU may establish a network connection to the SHO and may receive services using the remotely managed credentials. Secure remote subscription management may be repeated to associate the WTRU with another SHO.

19 Claims, 14 Drawing Sheets

(56) References Cited

U.S. PATENT DOCUMENTS

| | | | |
|---|---|---|---|
| 2009/0217038 A1* | 8/2009 | Lehtovirta et al. | 713/168 |
| 2009/0217348 A1* | 8/2009 | Salmela et al. | 726/2 |
| 2009/0253409 A1* | 10/2009 | Slavov et al. | 455/411 |
| 2010/0106967 A1* | 4/2010 | Johansson et al. | 713/158 |
| 2011/0223887 A1* | 9/2011 | Rune et al. | 455/411 |

OTHER PUBLICATIONS

PCT Application No. PCT/US2010/026404 : International Search Report and Written Opinion of the International Searching Authority, Sep. 2, 2010, 17 pages.

Third Generation Partnership Project, "Technical Specification Group Services and System Aspects; Feasibililty Study on Remote Management of USIM Application on M2M Equipment; (Release 9)," 3GPP TR 33.812 V1.3.0 (Feb. 2009).

Third Generation Partnership Project, "Technical Specification Group Services and System Aspects; Feasibility Study on Remote Management of USIM Application on M2M Equipment; (Release 9)," 3GPP TR 33.812 V9.0.0 (Dec. 2009).

$3^{rd}$ Generation Partnership Project (3GPP), S3-080163, "Architecture Modifications and Alternatives for Remote Management of USIM Application on M2M Equipment", Ericsson, 3GPP TSG SA WG3 Security—S3#50, Sanya, China, Feb. 25-29, 2008, 1-6.

InterDigital et al., "Discussion and Decision re incorporation into TR33.812," 3GPP TSG SA WG3 Security #52, S3-080620, Jun. 23-27, 2008, 6 pages.

$3^{rd}$ Generation Partnership Project; Technical Specification Group Service and System Aspects; Feasibility Study on Remote Management of USIM Application on M2M Equipment; (Release 8), 3GPP TR 33.812 V0.2.2, Sections 5.2.2.2 and 5.2.2.3, Fig. 1 and Fig. 2, (Mar. 20, 2008).

\* cited by examiner

SECURE REMOTE SUBSCRIPTION MANAGEMENT

CROSS REFERENCE TO RELATED APPLICATIONS

This application claims the benefit of U.S. provisional application No. 61/157,796 filed Mar. 5, 2009; which is incorporated by reference as if fully set forth herein.

FIELD OF INVENTION

This application is related to wireless communications.

BACKGROUND

Machine-to-Machine (M2M) communication, such as machine type communication (MTC), may include communication between devices without human interaction or intervention. In M2M communication a deployed terminal with M2M capability may be managed remotely without direct human interaction. Wireless communication, including M2M communication, may include establishing a connection using an operator that may be identified in a subscription. Accordingly, a method and apparatus for performing secure remote subscription management would be advantageous.

SUMMARY

A method and apparatus are disclosed for performing secure remote subscription management. Secure remote subscription management may include providing the Wireless Transmit/Receive Unit (WTRU) with a connectivity identifier, such as a Provisional Connectivity Identifier (PCID), which may be used to establish an initial network connection, for example, to an Initial Connectivity Operator (ICO), for initial secure remote registration, provisioning, and activation. The initial network connection and the information included in the PCID may be used to identify an ICO. A connection to the ICO may be used to remotely provision the WTRU with credentials associated with the Selected Home Operator (SHO). A credential, such as a cryptographic keyset, which may be included in the Trusted Physical Unit (TPU), may be allocated to the SHO and may be activated. The WTRU may establish a network connection to the SHO and may receive services using the remotely managed credentials. Secure remote subscription management may be repeated to associate the WTRU with another SHO.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station (MS), an advanced mobile station (AMS), a Machine to Machine (M2M) equipment (M2ME), a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, an advanced base station (ABS), a site controller, an access point (AP), or any other type of interfacing device capable of operating in a wireless environment. The terminology "WTRU" and "base station" are not mutually exclusive.

When referred to hereafter, the terminology "quality" or "signal quality" includes but is not limited to a measurement of the quality of a received signal. For example, Reference Signal Received Quality (RSRQ) in Long Term Evolution (LTE) or Common Pilot Channel (CPICH) Ratio of energy per modulating bit to the noise spectral density (Ec/No) in Universal Mobile Telecommunication System (UMTS). For simplicity, the quality of a signal received from a source may be referred to as the source's quality, for example the quality of a signal received from a WTRU may be referred to as the WTRU's quality. Similarly, the quality of a received signal that includes information may be referred to as the information's quality, for example the quality of a signal that includes an acknowledgment (ACK) may be referred to as the ACK's quality. When referred to herein, the terminology "received signal level" includes but is not limited to a measurement of power of a received signal; for example, Reference Signal Received Power (RSRP) in LTE or CPICH Received Signal Code Power (RSCP) in UMTS.

When referred to hereafter, the terms "trust", "trusted", and "trustworthy", as well as variations thereof, indicate an attestable, a quantifiable and observable manner of assessing whether a unit will function in an expected manner. When referred to hereafter, the terminology "Trusted Domain (TD)", and variations thereof, includes but is not limited to a Domain. When referred to hereafter, the terminology "Trusted Computing Environment (TCE)" includes but is not limited to a complete secure execution and storage environment for a WTRU platform. For example, a TCE may provide protection and separation for the provisioning, storage, execution and management of an identity of a device using hardware, or software, or both.

Figure 1:
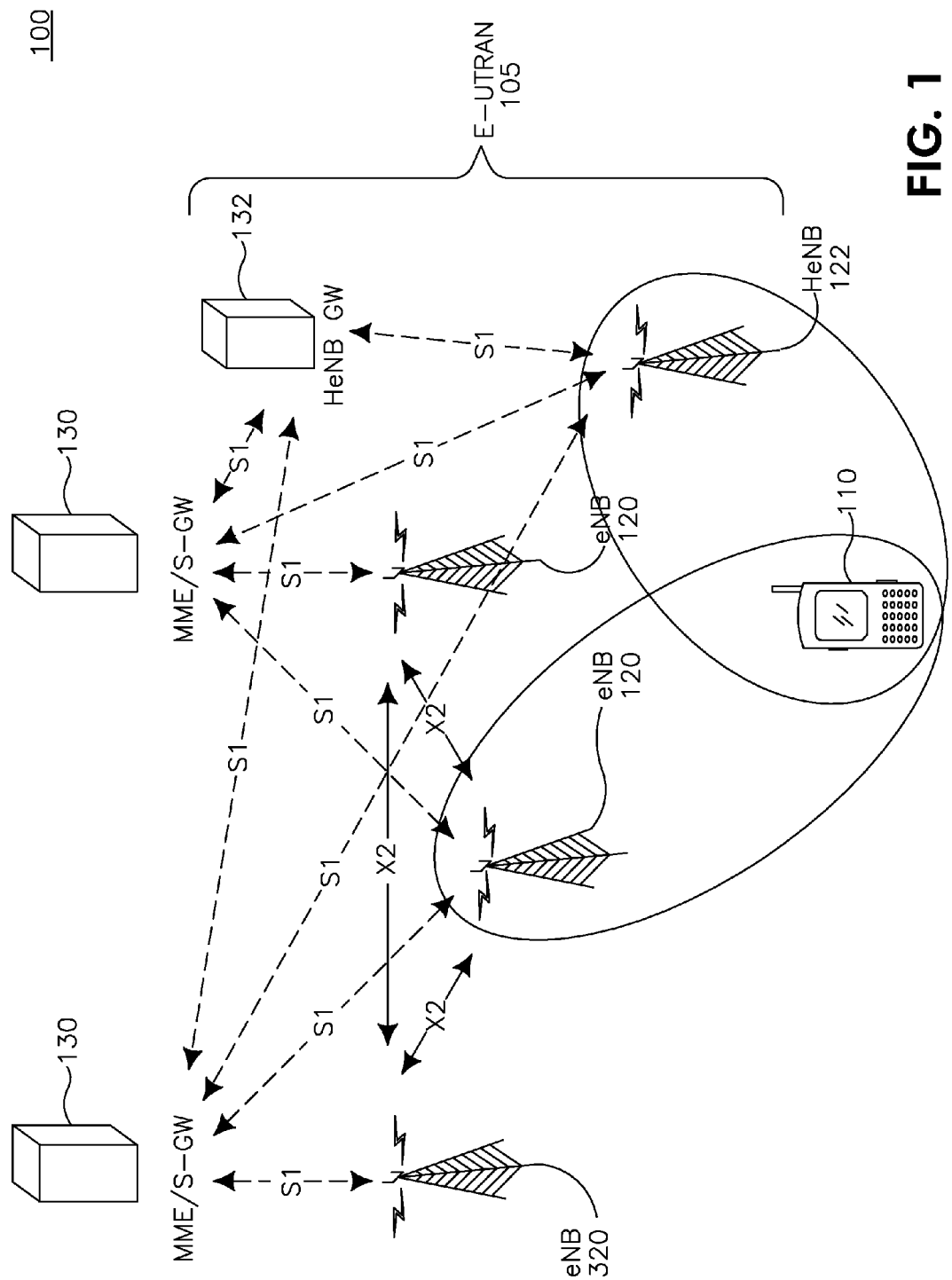
FIG. 1 shows a Long Term Evolution wireless communication network that includes an Evolved-Universal Terrestrial Radio Access Network.

FIG. 1 shows a diagram of an example of a Long Term Evolution (LTE) wireless communication system/access network 100 that includes an Evolved-Universal Terrestrial Radio Access Network (E-UTRAN) 105 and a WTRU 110. The E-UTRAN 105 is shown as including several E-UTRAN Node-Bs (eNBs) 120, a Home eNB (HeNB) 122, and a HeNB Gateway (HeNB GW) 132. The WTRU 110 may be in communication with an eNB 120, or the HeNB 122, or both. The eNBs 120 interface with each other using an X2 interface. Each of the eNBs 120 and the HeNB GW 132 interface with a Mobility Management Entity (MME)/Serving Gateway (S-GW) 130 through an S1 interface. The HeNB 122 may interface with the HeNB GW 132 through an S1 interface, or with the MME/S-GW 130 through an S1 interface, or with both. Although a single WTRU 110, a single HeNB, and three eNBs 120 are shown in FIG. 1, it should be apparent that any combination of wireless and wired devices may be included in the wireless communication system/access network 100.

Figure 2:
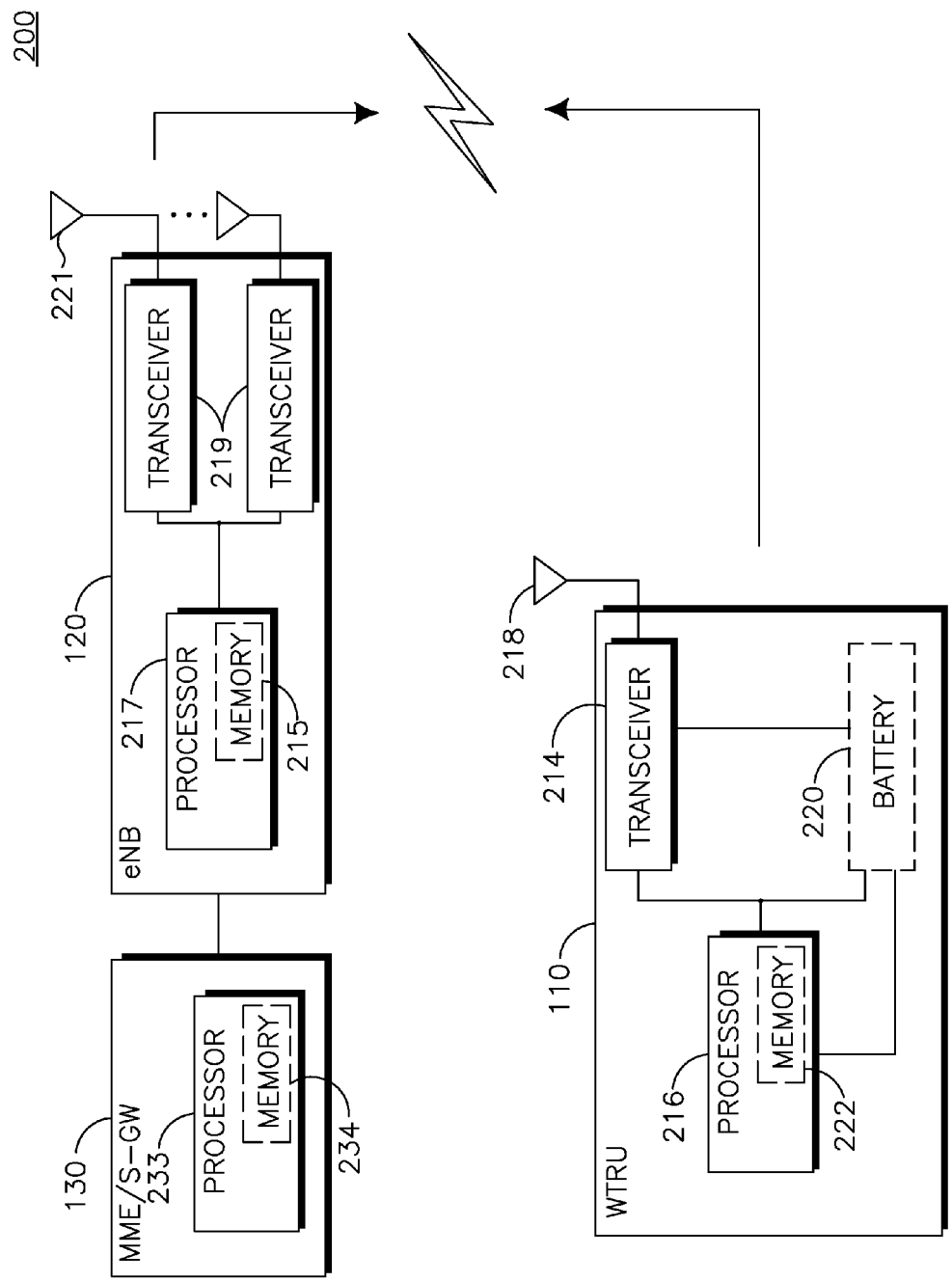
FIG. 2 shows a block diagram of an example of a Long Term Evolution wireless communication network including a wireless transmit/receive unit, an evolved Node-B, and a Mobility Management Entity Serving Gateway.

FIG. 2 is a block diagram of an example of a LTE wireless communication system 200 including the WTRU 110, the eNB 120, and the MME/S-GW 130. Although the eNB 120 and MME/S-GW 130 are shown for simplicity, it should be apparent that an example of a HeNB 122 and HeNB GW 132 may include substantially similar features. As shown in FIG. 2, the WTRU 110, the eNB 120 and the MME/S-GW 130 are configured to perform a method of secure remote subscription management.

In addition to the components that may be found in a typical WTRU, the WTRU 110 includes a processor 216 with an optional linked memory 222, at least one transceiver 214, an optional battery 220, and an antenna 218. The processor 216 is configured to perform a method of secure remote subscription management. The transceiver 214 is in communication with the processor 216 and the antenna 218 to facilitate the transmission and reception of wireless communications. In case a battery 220 is used in the WTRU 110, it powers the transceiver 214 and the processor 216.

In addition to the components that may be found in a typical eNB, the eNB 120 includes a processor 217 with an optional linked memory 215, transceivers 219, and antennas 221. The processor 217 is configured to perform a method of secure remote subscription management. The transceivers 219 are in communication with the processor 217 and antennas 221 to facilitate the transmission and reception of wireless communications. The eNB 120 is connected to the Mobility Management Entity/Serving Gateway (MME/S-GW) 130 which includes a processor 233 with an optional linked memory 234.

The LTE network shown in FIGS. 1 and 2 is just one example of a particular communication network; other types of communication networks may be used without exceeding the scope of the present disclosure. For example, the wireless network may be a Universal Mobile Telecommunication System (UMTS) network or a Global System for Mobile communication (GSM) network. When referred to hereafter, the terminology "Macro Cell" includes but is not limited to a base station, an E-UTRAN Node-B (eNB), or any other type of interfacing device capable of operating in a wireless environment. When referred to hereafter, the terminology "Home Node-B (HNB)" includes but is not limited to a base station, a Home evolved Node-B (HeNB), a femtocell, or any other type of interfacing device capable of operating in a Closed Subscriber Group wireless environment.

Figure 3:
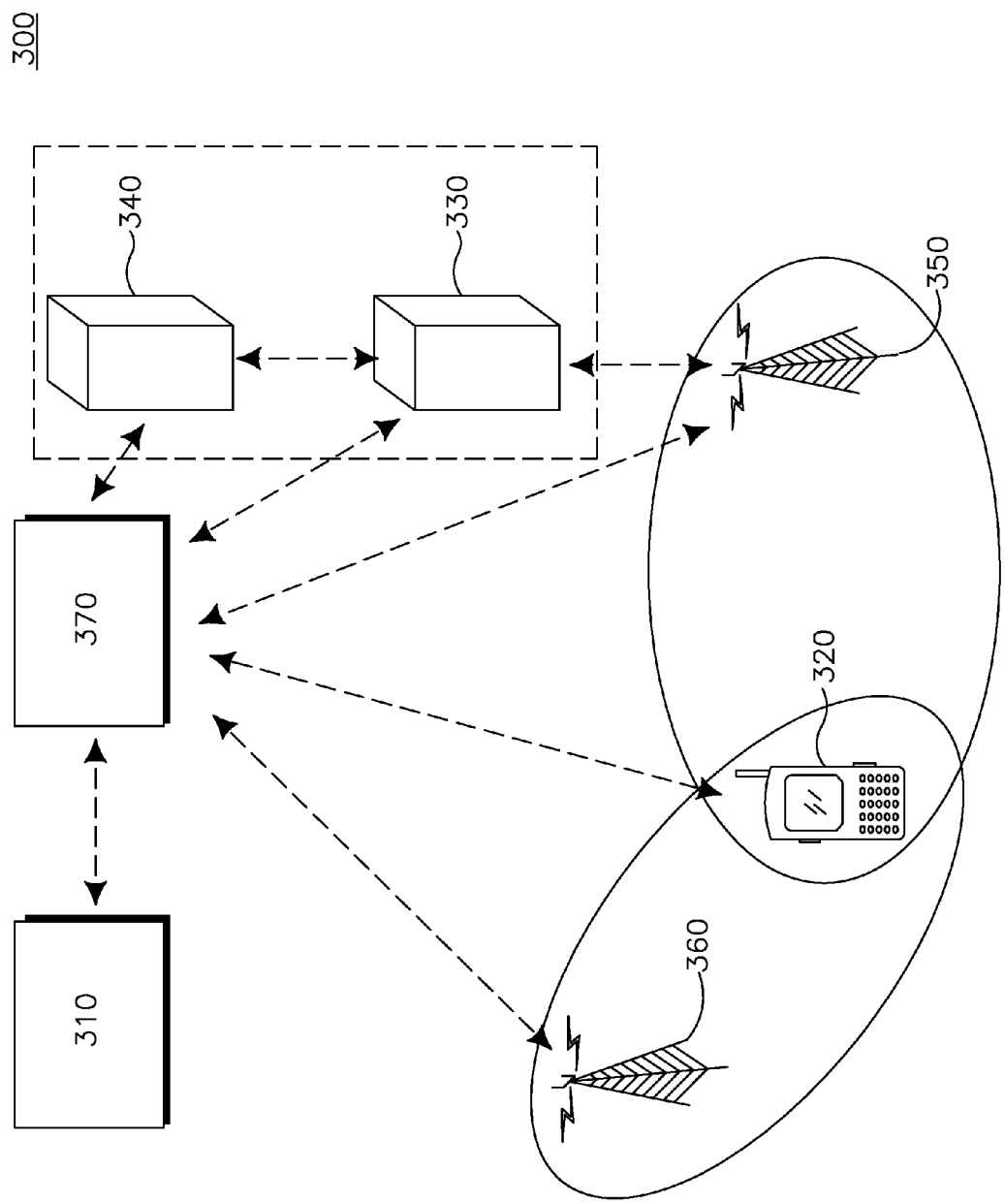
FIG. 3 shows a block diagram of an example of wireless transmit/receive unit subscription management and communication.

FIG. 3 is a block diagram of an example of WTRU subscription management and communication. FIG. 3 shows a trustworthy unit provider 310 that may provide a Trustworthy Physical Unit (TPU), such as a Universal Integrated Circuit Card (UICC), or a Universal Serial Bus (USB) token or a memory card including a secure processor, such as a smart card. For example, the TPU provider 310 may be a trusted manufacturer. FIG. 3 also shows a WTRU 320 such as a M2M-enabled equipment (M2ME), an Initial Connectivity Operator (ICO) 330, a Registration Operator (RO) 340, a first Selected Home Operator ($SHO_A$) 350, a second Selected Home Operator ($SHO_B$) 360, and a subscriber 370 such as an owner of the WTRU 320. A Home Operator, such as $SHO_A$ or $SHO_B$, may be a Mobile Network operator (MNO) and may provide mobile connectivity and communication services. Optionally, the ICO 330 and the RO 340 may be tightly coupled, such as in a single entity, as represented by the broken line in FIG. 3. The communication paths shown in FIG. 3 are for illustration, it should be apparent that other communication paths may be used as described herein.

A WTRU may establish a network connection and receive services via a network provided by an operator, such as a Mobile Network Operator (MNO). To identify an appropriate MNO, the WTRU may be provisioned with credentials associated with the MNO. For example, the credentials may be included on a TPU, and may be installed in the WTRU at the time of manufacture or distribution. For example, a seller may install a TPU in the WTRU before providing the WTRU to a user. The WTRU may connect to, and receive services from, a network provided by the provisioned MNO. However, a WTRU may be distributed without a provisioned MNO or a subscription may be changed to change from a current MNO, such as $SHO_A$, to another MNO, such as $SHO_B$. Accordingly, a method and apparatus for secure remote subscription management of a WTRU is provided.

Secure remote subscription management may include providing the WTRU with a connectivity identifier, such as a Provisional Connectivity Identifier (PCID), which may be used to establish an initial network connection, for example, to an Initial Connectivity Operator (ICO), for initial secure remote registration, provisioning, and activation. The initial network connection may be established via a visited network. The PCID may have a structure that is similar to an International Mobile Subscriber Identifier (IMSI), or a Temporary IMSI (TIMSI), and may include information which may be used, for example by the visited network, to identify the ICO. Optionally, the visited network may include the ICO.

The initial network connection and the information included in the PCID may be used to identify an ICO. A connection to the ICO may be used to remotely provision the WTRU with credentials associated with the SHO. A credential, such as a cryptographic keyset, which may be included in the TPU, may be allocated to the SHO and may be activated. The WTRU may establish a network connection to the SHO and may receive services using the remotely managed credentials. Secure remote subscription management may be repeated to associate the WTRU with another SHO. FIGS. 4A-8B show examples of secure remote subscription management.

Figure 4A:
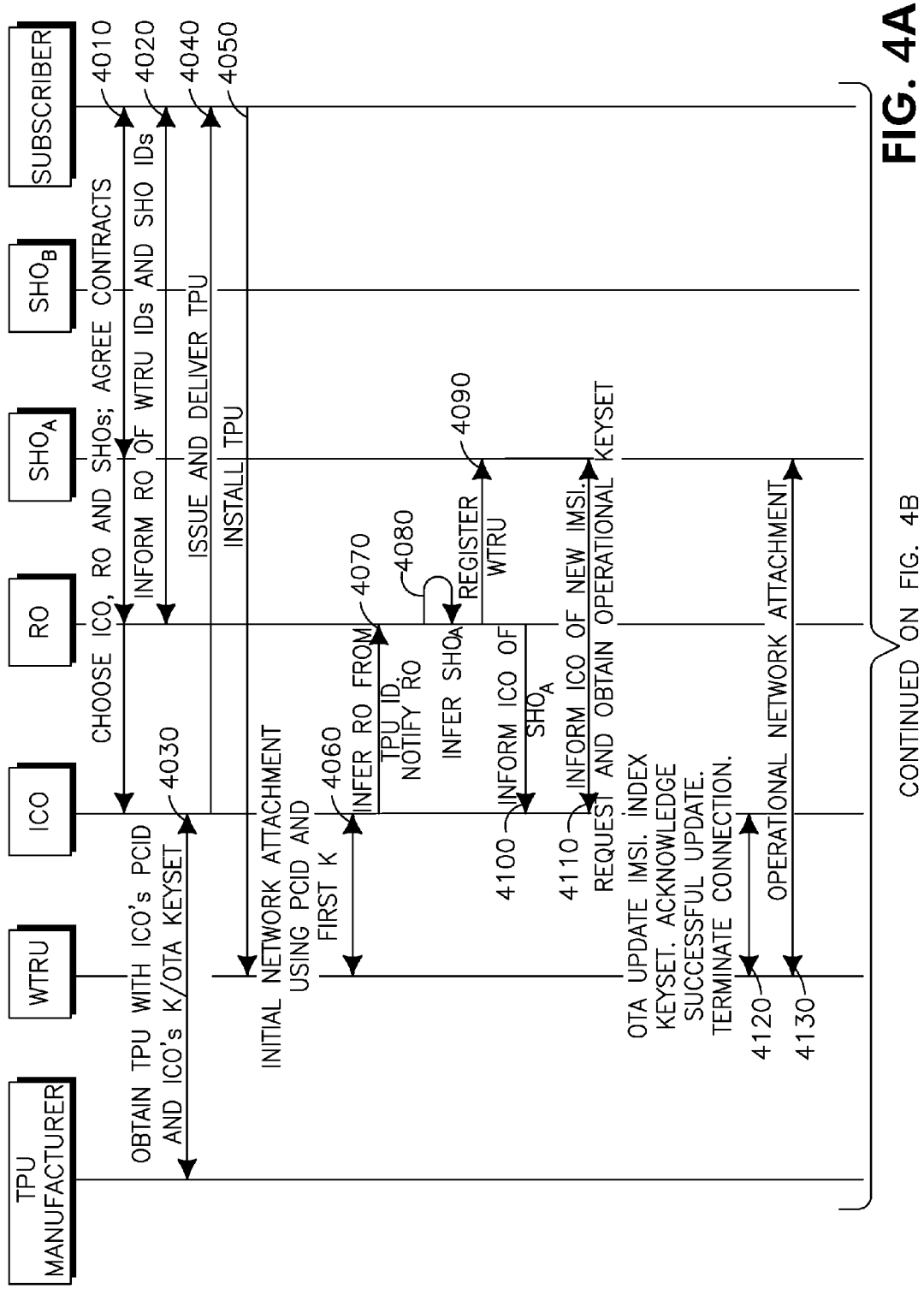
FIGS. 4A and 4B show a diagram of an example of a method for secure remote subscription management.
Figure 4B:
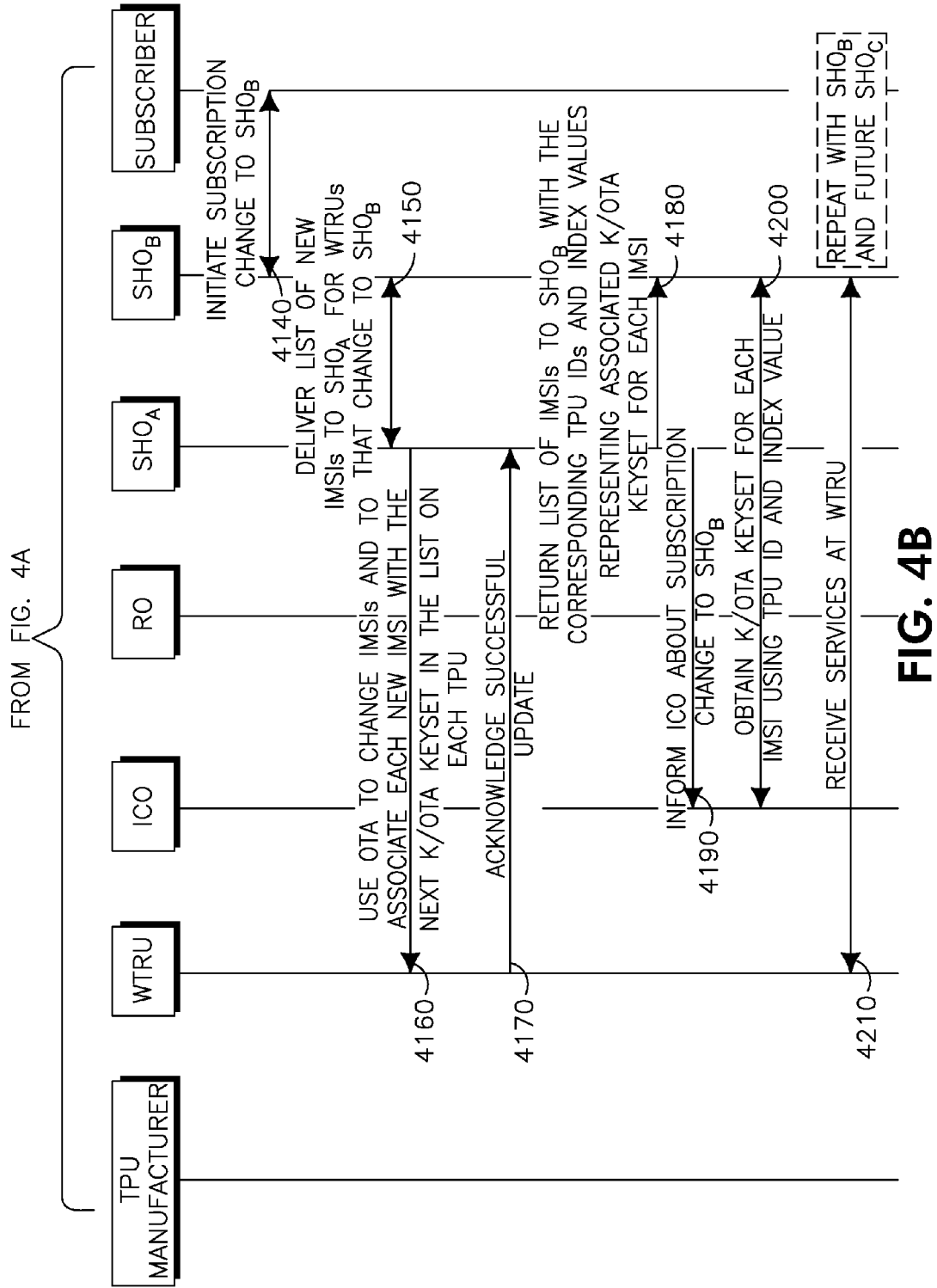

FIGS. 4A and 4B show a diagram of an example of a method for secure remote subscription management. Secure remote subscription management may include establishing initial connectivity to the ICO, registration of the WTRU to the SHO, credential provisioning, activation of credentials in the TPU for the SHO subscription, and distribution of subscription-related data, such as cryptographic keys, to the SHO.

A subscriber, such as an equipment manufacturer or user, may select and establish a contract with an ICO, a RO, a $SHO_A$, a $SHO_B$, or a combination thereof (4010). The subscriber may register an identity of the WTRU with a RO (4020). Registration may include reporting one or more SHOs, which are associated with the WTRU, to the RO. Alternatively, a SHO may be associated with a RO and may perform the registration.

The ICO may obtain ICO credentials, which may be used for initial network connectivity, and MNO credentials, which may be used for operational network connectivity (4030). The MNO credentials may include multiple credentials each of which may be associated with an operator. For example, an MNO credential may be assigned to a SHO. Optionally, a plurality of credentials may be initially assigned to the ICO and may be reassigned to a SHO for a subscription change. The credentials may be securely stored on a TPU, such as a UICC or a Virtual Subscriber Identity Module (VSIM) in the WTRU. The ICO may obtain the credentials from a trusted credentials provider, such as a TPU provider.

The ICO may provide the TPU, including the credentials, to the subscriber (4040). The subscriber may install the TPU in the WTRU (4050). For example, the TPU may include a UICC, which may include a network access unit, such as a Subscriber Identity Module (SIM) or a Universal SIM (USIM), associated with the ICO and a network access unit associated with a SHO, The TPU supplier may provide the TPU with an identity (TPU-ID), which may be similar to an Integrated Circuit Card Identity (ICC-ID). For example, the TPU may include a UICC and the identity may include an ICC-ID associated with the UICC. The TPU-ID may be used as an identifier for the WTRU. Alternatively, the WTRU may include multiple TPUs and an independent identity (WTRU-ID), which may be generated by the WTRU manufacturer or the subscriber. Optionally, the TPU-ID and the WTRU-ID may be used in combination.

The credentials may include a cryptographic keyset, such as $\{K, K_{OTA}\}$. For example, K may indicate a Universal Mobile Telecommunication System (UMTS) Authentication and Key Agreement (AKA) authentication root key; and $K_{OTA}$ may indicate a cryptographic key that may be used for securing communication between an operator, such as an ICO or a SHO, and the WTRU. The credentials may include an identifier, such as a Mobile Network Code (MNC) or a Mobile Country Code (MCC). The identifier may be included in a PCID, which may be similar to an IMSI.

An IMSI, and similarly a PCID, may include 15 digits. The first 3 digits may indicate a MCC. The MCC may be followed by a MNC, which may include 2 digits, such as a European standard MNC, or 3 digits, such as a North American standard MNC. The remaining digits of the IMSI may include a mobile station identification number (MSIN), which may be associated with a network's subscriber or customer base. Table 1 shows an example IMSI, as well as an example structure of the IMSI. It should be apparent that a PCID may include a similar structure.

TABLE 1

| IMSI: 310150123456789 | | |
|---|---|---|
| MCC | 310 | USA |
| MNC | 150 | AT&T Mobility |
| MSIN | 123456789 | |

The WTRU may access a network using the provisioned credentials (4060). For example, the WTRU may be provisioned with a first credential associated with an ICO. The first credential may include a PCID and a keyset. The WTRU may use the ICO credentials to establish an initial connection to the ICO. Optionally, the ICO may authenticate the WTRU using a Home Location Register/Authentication Center (HLR/AuC). The HLR/AuC may authenticate the WTRU using, for example, an authentication key corresponding to the keyset associated with the ICO. The WTRU may be provided with an Internet Protocol (IP) address and may receive services from the ICO.

The ICO may determine an appropriate RO using the TPU and may send a notification to the RO, for example, via IP connectivity, to indicate that the WTRU has established connection to the ICO (4070). For example, the TPU may include a UICC that may include a unique identifier, such as an ICC-ID. The unique identifier may be associated with a RO, and the ICO may identify the RO based on the unique identifier, for example, using a cross-reference table or a database.

Alternatively, the ICO may determine the appropriate RO's identity using other information from the TPU, such as a PCID. Alternatively, the TPU may include a device management (DM) file which may indicate the RO. Optionally, the DM file may be downloaded into the TPU and the file download may be performed remotely.

The above alternatives may be combined using multiple PCIDs. The PCIDs may map to a combination of ICOs and ROs, such as in an M×N mapping. A TPU may be associated with multiple ICC_IDs. Optionally, the subscriber, or the SHO, may identify the RO based on information associated with a TPU. For example, the information may be supplied by the trusted credentials provider. Optionally, the information may be provided in batches. For example, a batch may be identified using a shared identifier such as a production serial number, which may be included in the PCIDs or the ICC_IDs. The TPUs associated with a batch may be associated with predefined RO information. For example, the RO information may be included in a persistent data file in the TPU.

Alternatively, multiple WTRUs may be provisioned with a PCID and may be uniquely identified based on location information, such as a physical location, a network location, or both, date-time of attachment attempt information, or both. For example, two TPUs provisioned with a credential may attempt to attach to the network at different times.

Optionally, a RO may be reassigned with respect to a WTRU. For example, a RO's ID may be encoded in a PCID, and the PCID may be updated to indicate a different RO. Unused TPUs may be reassigned by changing an association between, for example, the ICC_ID and the RO's ID. The change may be part of a background process.

Alternatively, ICO or RO information may be stored on the WTRU outside of the TPU. Optionally, the TPU and the WTRU may securely communicate, for example, using a secure channel. The secure communication may include integrity protection, confidentiality protection, or both. For example, a secure channel may be established between the WTRU and the TPU using cryptographic keys. Information regarding the RO, the ICO, or both may be securely communicated between the WTRU and the TPU for subsequent use, for example, in a data-field, such as a PCID. In another alternative, the WTRU may send its identity to the TPU and the TPU may generate a PCID using WTRU's ID and the ICO information. The ICO may associate the combined information with a RO.

The RO may identify an appropriate $SHO_A$ using, for example, a predetermined list of identifiers associated with the SHO (4080). To generate the list, the subscriber may send a message to each SHO that is associated with the WTRU. The message may include a list of WTRU ID-to-PCID associations. The associations may be encapsulated as objects. For simplicity, a WTRU ID-to-PCID association will be referred to as an object herein; however, it should be apparent that any other data structure may be used. The WTRU ID may be similar to an International Mobile Equipment Identity (IMEI), or, alternatively, may be similar to a Fully Qualified Domain Name (FQDN). Each SHO may identify the appropriate RO based on the PCID, update the list of objects by adding its ID, such as a MNC to each object, and send the updated list to the identified RO. The RO may use the updated list to generate a list of SHOs that are associated with the WTRU.

The RO may determine the appropriate $SHO_A$ from the generated list based on, for example, a context of the WTRU, such as the WTRU's location. The RO, the ICO, or both, may be identified in the PCID and the ICO, the RO, or both may be communicated to the ICO, the RO, or both by the subscriber in a list of all PCIDs for that ICO or RO.

Alternatively, each SHO may send a list of ROs to the subscriber, for example, as part of registration with the SHO. The list may be preferentially ordered and may be geographically grouped. The subscriber may generate a combined RO list including RO information from multiple SHOs. The combined RO list may be preferentially ordered and may be geographically grouped. The subscriber may embed the combined RO list, or a subset thereof, in the WTRU. The subscriber may send a list of objects, including WTRU ID-to-PCID associations, to the ROs. The WTRU may use the combined RO list to determine a RO to use during network attachment. The WTRU may attempt to connect to ROs in preferential order. Optionally, the WTRU may use location information to determine the RO.

The RO may register the WTRU with $SHO_A$ (4090). The RO may send a notification to the ICO to indicate $SHO_A$ with which the WTRU has been registered (4100). $SHO_A$ and the ICO may exchange an IMSI, for the WTRU, and an operational keyset (4110). For example, $SHO_A$ may send a message, including the IMSI, to the ICO, and may send a message to the ICO to request a keyset for use with the subscription, such as for network access and OTA communication. The ICO may send a message including the requested keyset to $SHO_A$.

The ICO may perform an over the air (OTA) IMSI installation on the WTRU's TPU (4120). The TPU may index the operational keyset, for example, to the next keyset. The WTRU may send an acknowledgement (ACK) to the ICO to indicate a status of the update. If the WTRU looses its connection before the ACK is sent, the WTRU may reconnect and transmit the ACK. Optionally, the WTRU may send the ACK to the ICO via $SHO_A$. Optionally, the ICO may wait for the ACK and the update may be invalidated if the ACK is not received by the ICO.

Optionally, the PCID and keyset used for initial connectivity may be preserved. Where, for example, the WTRU fails to establish a network connection to $SHO_A$, the WTRU may revert to the PCID and keyset used for initial connectivity and may reinitiate the secure remote subscription management. The WTRU may terminate the initial network attachment with the ICO. The WTRU may begin using the new IMSI or may be reset or re-powered to initiate activation of the new IMSI.

The WTRU may establish an operational network attachment via $SHO_A$, or, optionally, via a visited network, and may receive services from $SHO_A$ (4130). The TPU and $SHO_A$ may establish the network attachment using the keyset, for example, in a UMTS AKA procedure.

The subscriber may initiate a subscription change from $SHO_A$ to $SHO_B$ (4140). For example, the subscriber may select $SHO_B$ from a list provided to the WTRU by $SHO_A$. Alternatively, the subscriber may send a request for the subscription change to $SHO_B$ to a known location, such as an Internet address, of $SHO_A$ or $SHO_B$. The SHOs may negotiate the terms of the subscription change.

$SHO_B$ may send a new IMSI to $SHO_A$ (4150). Optionally, $SHO_B$ may send a list of new IMSIs to $SHO_A$ for each of a plurality of WTRUs for subscription change to $SHO_B$.

Although the following description refers to a WTRU, it should be apparent that the method described may be applied to multiple WTRUs.

$SHO_A$ may perform an OTA IMSI update for the WTRU (4160). The update may include replacing the IMSI associated with $SHO_A$ with the IMSI associated with $SHO_B$, and associating the new IMSI with another keyset in the TPU. The WTRU may send an ACK to $SHO_A$ indicating the update status (4170). Optionally, $SHO_A$ may wait for the ACK, and the update may be terminated if the ACK is not received.

$SHO_A$ may send a message to $SHO_B$ to indicate the association between the new IMSI and the keyset (4180). The message may include an index of each IMSI-to-key pair association. Optionally, for example in response to failure to attach to the networks of $SHO_A$ or $SHO_B$, the WTRU may revert to use of the ICO's PCID and keyset and may restart the secure remote subscription management.

$SHO_A$ may send a message to the ICO to inform the ICO about the subscription change (4190). $SHO_B$ may send a message to the ICO to request the keyset which is associated with the new IMSI (4200). The request may include the WTRU's identifier, such as the WTRU's UICC_ID, and the IMSI-to-keyset association. The ICO may send the keyset and a confirmation of the IMSI-to-keyset associations to $SHO_B$. $SHO_B$ may use the IMSI and the keyset to provide connectivity services to the WTRU (4210). It should be apparent that the WTRU may migrate to another SHO, such as $SHO_C$, using a similar method, as indicated by the broken line in FIG. 4B.

Optionally, new keysets may be generated instead of, or in addition to, keyset provisioning as described in FIGS. 4-8. Additional keysets may be securely installed in the WTRU. The WTRU or the TPU may detect a shortage of key pairs. The TPU may notify the WTRU of the shortage, and the WTRU may send a request for new key pairs to the ICO, or the RO, or both. For example, the TPU may detect the shortage during a subscription change. Alternatively, new key pairs may be provided using a Universal SIM (USIM) Application Toolkit/Card Application Toolkit (USAT/CAT). Optionally, the ICO may track the number of key sets available to the TPU, and may initiate a key set update as needed.

Alternatively, the TPU and the ICO may retain and reuse keysets in, for example, a first-in first-out manner. In another alternative, the TPU may generate a new keyset using, for example, a master key. The new keyset generation may be reported to the ICO, which may generate a keyset that matches the TPU generated keyset. Alternatively, new keysets may, for example, be generated by the TPU using a keyset generation protocol, such as a Public Key Cryptography Standards (PKCS) protocol, and the public keys of the keysets may be uploaded via the ICO for certification. In another alternative, the new keysets may be generated using a shared symmetric key generation protocol, such as a generic bootstrapping architecture (GBA) with UICC-based enhancement (GBA_U) protocol or a European standard EN726 part 7 protocol. In another alternative, the ICO may send a message to the TPU to initiate the generation of a new set of credentials.

Figure 5A:
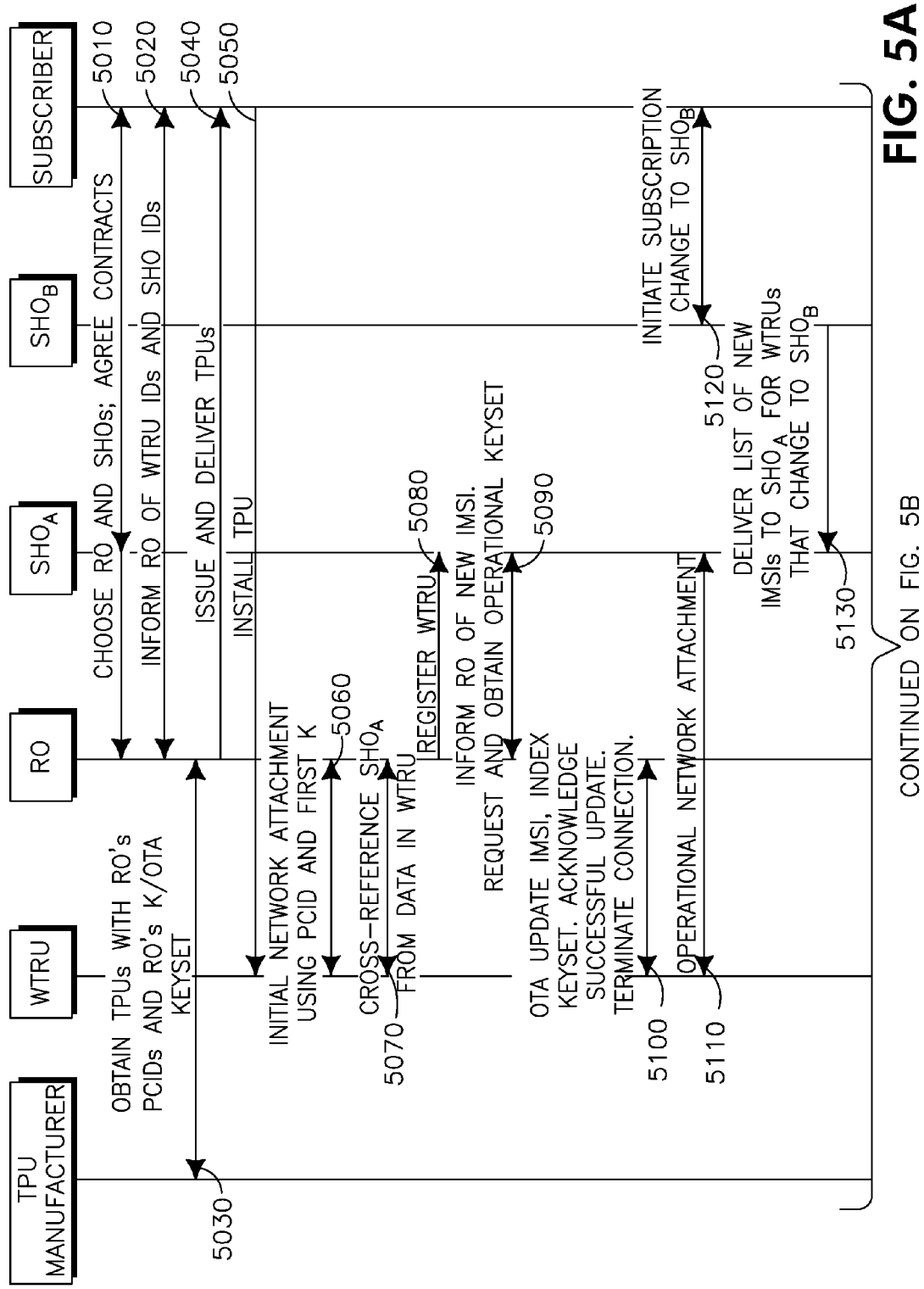
FIGS. 5A and 5B show a diagram of an example of a method for secure remote subscription management with a combined registration operator and initial connectivity operator.
Figure 5B:
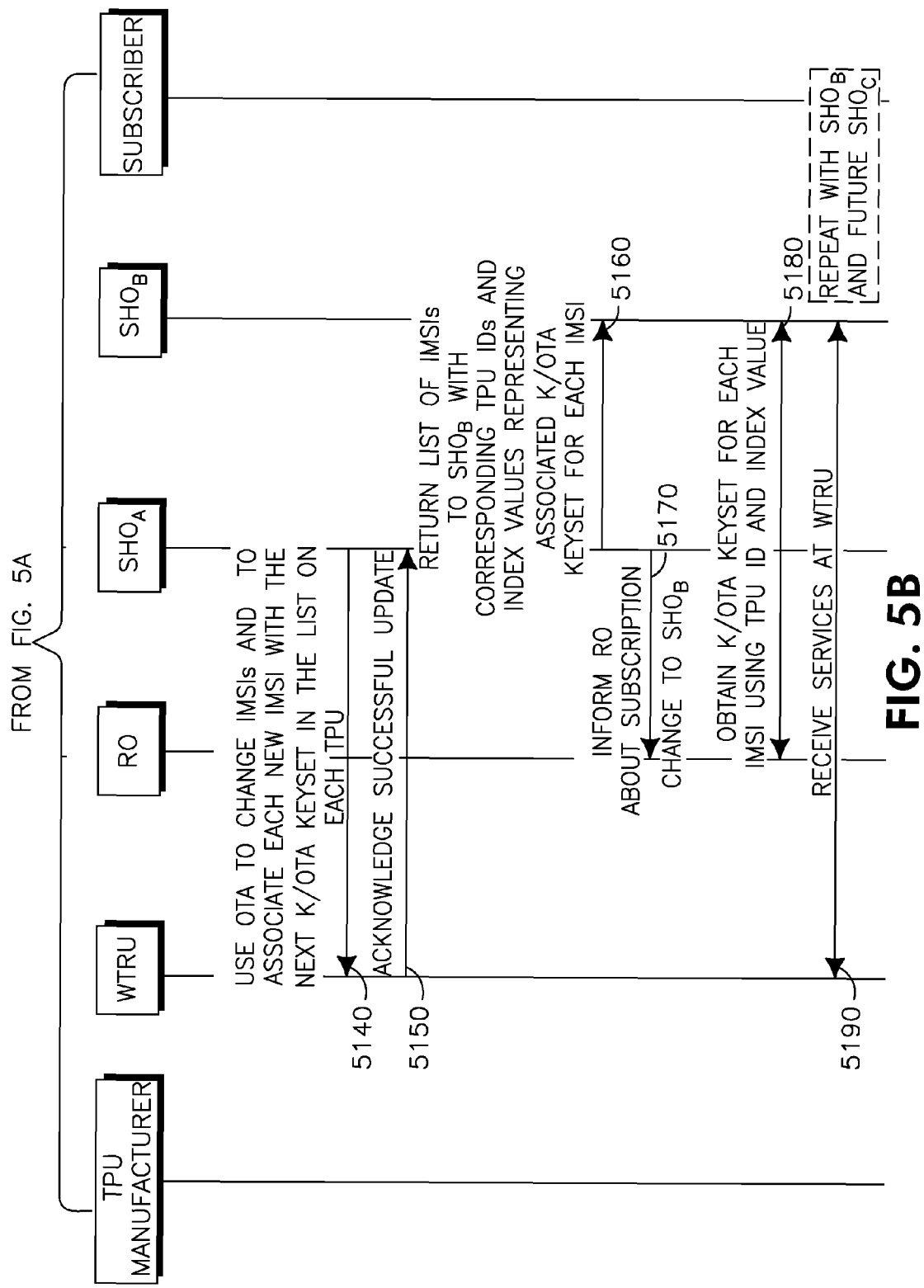

FIGS. 5A and 5B show a diagram of an example of a method for secure remote subscription management with a combined RO and ICO. This method is similar to the method shown in FIGS. 4A-4B except as described herein. The combined ICO/RO may be identified by the PCID. For example, the PCID, which may be similar to an IMSI, may include an appropriate MCC/MNC. The ICO and the RO may be included in a single logical or physical unit. The combined ICO/RO may be identified on the TPU by the TPU supplier.

A subscriber, such as an equipment manufacturer or user, may select and establish a contract with a RO, a $SHO_A$, a $SHO_B$ or a combination thereof (5010). The ICO (not separately shown) and the RO may be a single entity and, for simplicity, will be referred to as the RO with regard to FIGS. 5A and 5B. The subscriber may register an identity of the WTRU with a RO (5020). Registration may include reporting one or more SHOs that are associated with the WTRU to the RO. Alternatively, a SHO may perform the registration.

The RO may obtain RO credentials and MNO credentials (5030). The RO credentials and the MNO credentials may include cryptographic keysets that may be used for authenticated network access and for remote secure communications between the RO and the TPU or the MNO and the TPU. Each credential may include an identity, such as a PCID or IMSI, associated with the RO or the MNO, respectively. The RO may provide the TPU, including the credentials, to the subscriber (5040). The subscriber may install the TPU in the WTRU (5050).

The WTRU may access a network and establish an initial network connection to the RO using the provisioned credentials (5060). The WTRU may receive services via the initial network connection to the RO.

The RO may identify an appropriate $SHO_A$ (5070), and may register the WTRU with $SHO_A$ (5080) using, for example, information obtained from the WTRU. $SHO_A$ may send a message, including a PCID for the WTRU, to the RO (5900). $SHO_A$ may send a request for an MNO keyset to the RO. The RO may send the MNO keyset to $SHO_A$.

The RO may perform an OTA IMSI update on the TPU (5100). The TPU may index the operational keyset, and may send an acknowledgement (ACK) to the RO to indicate a status of the update. The WTRU may terminate the initial network connection. The WTRU may establish an operational network attachment with $SHO_A$ (5110).

The subscriber may initiate a subscription change from $SHO_A$ to $SHO_B$ (5120). $SHO_B$ may send a new IMSI to $SHO_A$ (5130). Although the following description refers to a WTRU, it should be apparent that the method described may be applied to multiple WTRUs.

$SHO_A$ may perform an OTA IMSI update for the WTRU (5140). The WTRU may send an ACK to $SHO_A$ indicating the update status (5150). $SHO_A$ may send a message to $SHO_B$ to indicate the association between the new IMSI and the keyset (5160).

$SHO_A$ may send a message to the RO to inform the RO about the subscription change (5170). $SHO_B$ may send a message to the RO to request the keyset which is associated with the new IMSI (5180) and may send the IMSI-to-keyset associations to RO. $SHO_B$ may use the IMSI and the keyset to provide connectivity services to the WTRU (5190). Optionally, for example in response to failure to attach to the networks of $SHO_A$ or $SHO_B$, the WTRU may revert to use of the RO's PCID and keyset and may restart the secure remote subscription management, It should be apparent that the WTRU may change subscription to another SHO, such as $SHO_C$, using a similar method, as shown by the broken line in FIG. 5B.

Figure 6A:
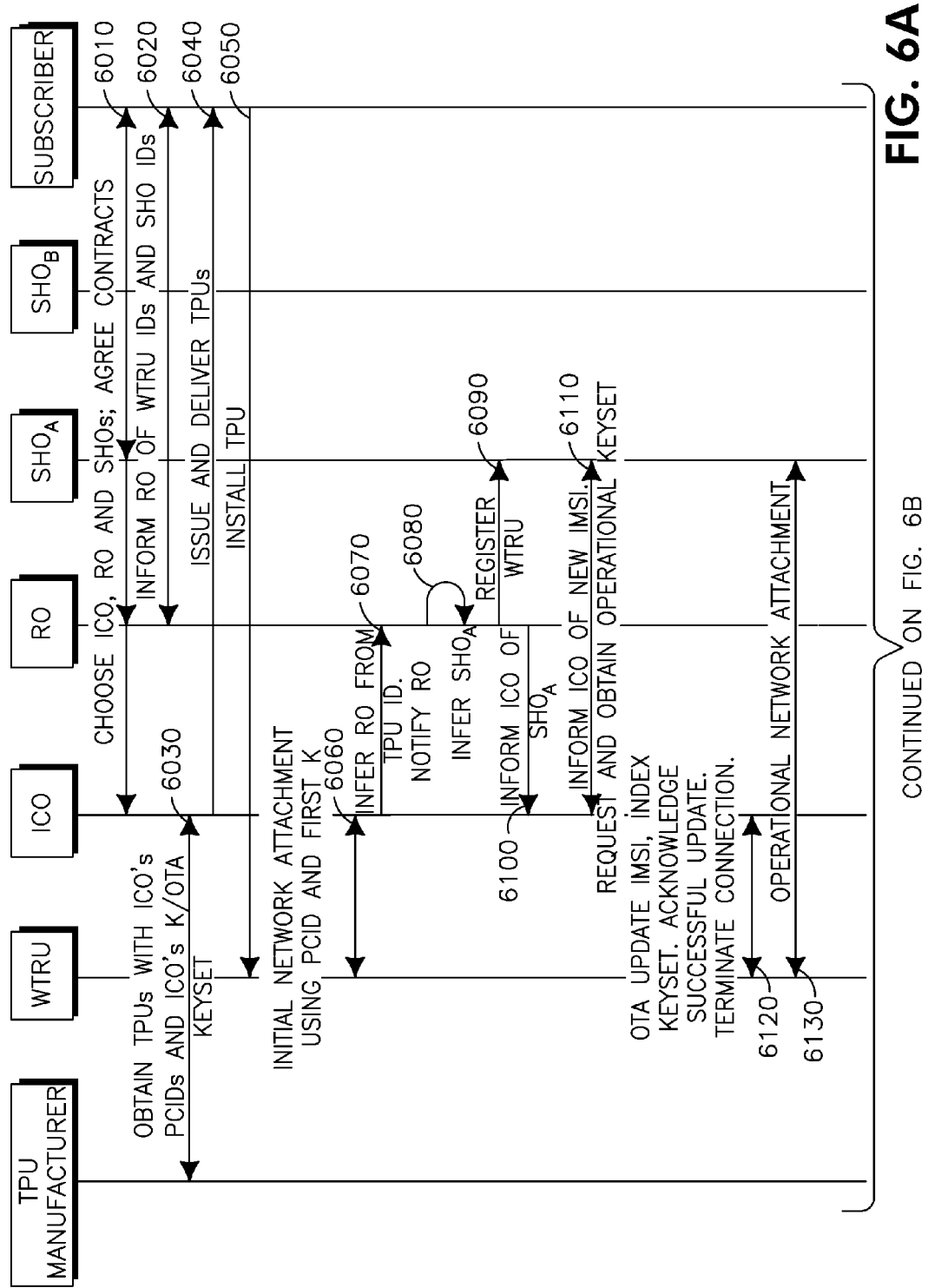
FIGS. 6A and 6B show a diagram of an example of a method for secure remote subscription management with an initial connectivity operator initiated over the air updates.
Figure 6B:
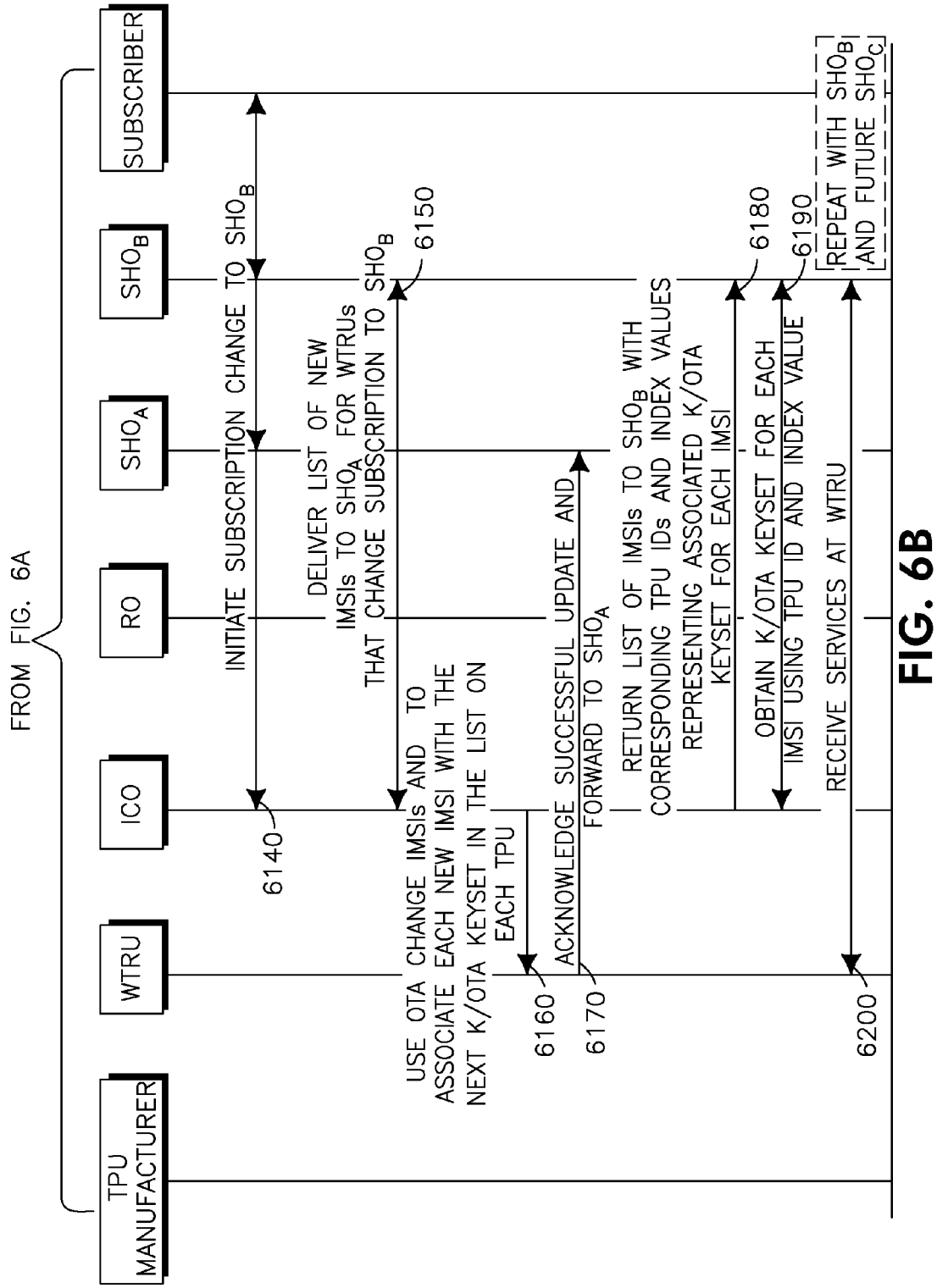

FIGS. 6A and 6B show a diagram of an example of a method for secure remote subscription provisioning with ICO initiated OTA updates. This method is similar to the method shown in FIGS. 4A and 4B except as described herein. The ICO may include a key escrow entity, and may be a trustworthy organization, similar to a certificate authority (CA). Although described in reference to FIGS. 6A and 6B, it should be apparent that the ICO, or the combined ICO/RO, as described in any of the Figures, may be a key escrow entity or a trustworthy organization. The ICO, or the combined ICO/RO may send an OTA message to the TPU to initiate installation of the IMSI associated with $SHO_B$ and to cause the TPU to index to the next keyset. The ICO, or the combined ICO/RO, may have access to the keys and may initiate an OTA TPU update, for example, using IP connectivity.

A subscriber, such as an equipment manufacturer or user, may select and establish a contract with an ICO, a RO, a $SHO_A$, a $SHO_B$, or a combination thereof (6010). The subscriber may register an identity of the WTRU with a RO (6020). The ICO may obtain ICO credentials, which may be used for initial network connectivity, and MNO credentials, which may be used for operational network connectivity (6030).

The ICO may provide the TPU, including the credentials, to the subscriber (6040). The subscriber may install the TPU in the WTRU (6050). The WTRU may access a network using the provisioned credentials (6060).

The ICO may determine an appropriate RO using the TPU (6070). The ICO may send a notification to the RO, for example, via IP connectivity, to indicate that the WTRU has established connection to the ICO.

The RO may identify an appropriate $SHO_A$ using, for example, a predetermined list of identifiers associated with the SHO (6080). The RO may register the WTRU with $SHO_A$ (6090). The RO may send a notification to the ICO to indicate $SHO_A$ with which the WTRU has been registered (6100).

$SHO_A$ and the ICO may exchange an IMSI for the WTRU and an operational keyset (6110). The ICO may perform an over the air (OTA) IMSI installation on the WTRU's TPU (6120). The WTRU may terminate the initial network attachment with the ICO. The WTRU may establish an operational network attachment via $SHO_A$, or, optionally, via a visited network, and may receive services from $SHO_A$ (6130).

The subscriber may initiate a subscription change from $SHO_A$ to $SHO_B$ (6140). The subscriber may select $SHO_B$ from a list provided to the WTRU by $SHO_A$. Alternatively, the subscriber may send a request for a subscription change to $SHO_B$ to a known location, such as an Internet address, of $SHO_A$ or $SHO_B$. The SHOs may negotiate the terms of the subscription change.

$SHO_B$ may send a new IMSI to the ICO (6150). The ICO may perform an OTA IMSI update for the WTRU (6160). The WTRU may send an ACK to the ICO indicating the update status and the ICO may forward the update status message to $SHO_A$ (6170). The ICO a message to $SHO_B$ to indicate the association between the new IMSI and the keyset (6180).

$SHO_B$ may send a message to the ICO to request the keyset which is associated with the new IMSI (6190). The ICO may send the keyset and a confirmation of the IMSI-to-keyset associations to $SHO_B$. $SHO_B$ may use the IMSI and the keyset to provide connectivity services to the WTRU (6200). It should be apparent that the WTRU may change subscription to another SHO, such as $SHO_C$, using a similar method, as shown by the broken line in FIG. 6B.

Figure 7A:
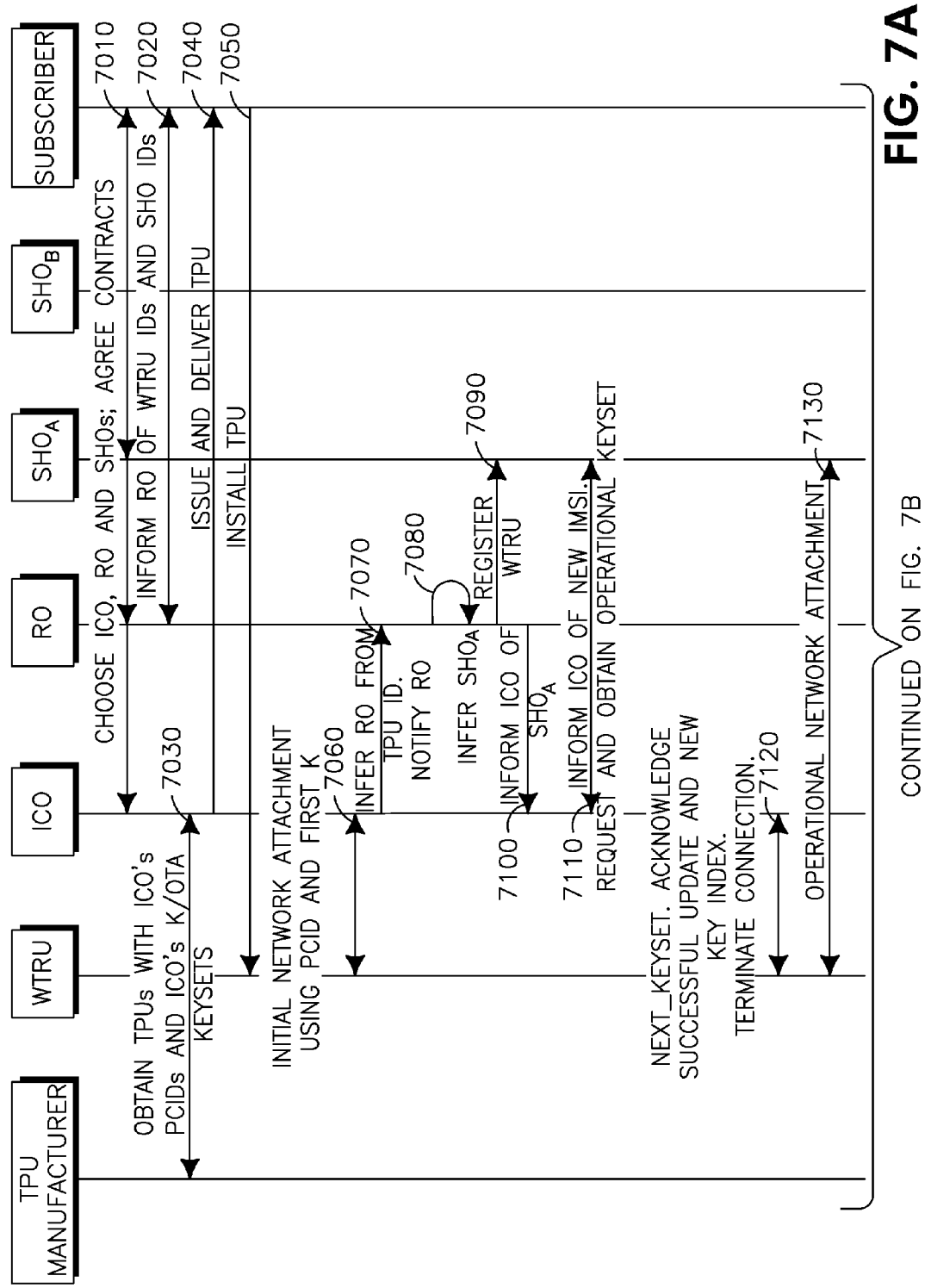
FIGS. 7A and 7B show a diagram of an example of a method for secure remote subscription management with keyset protection.
Figure 7B:
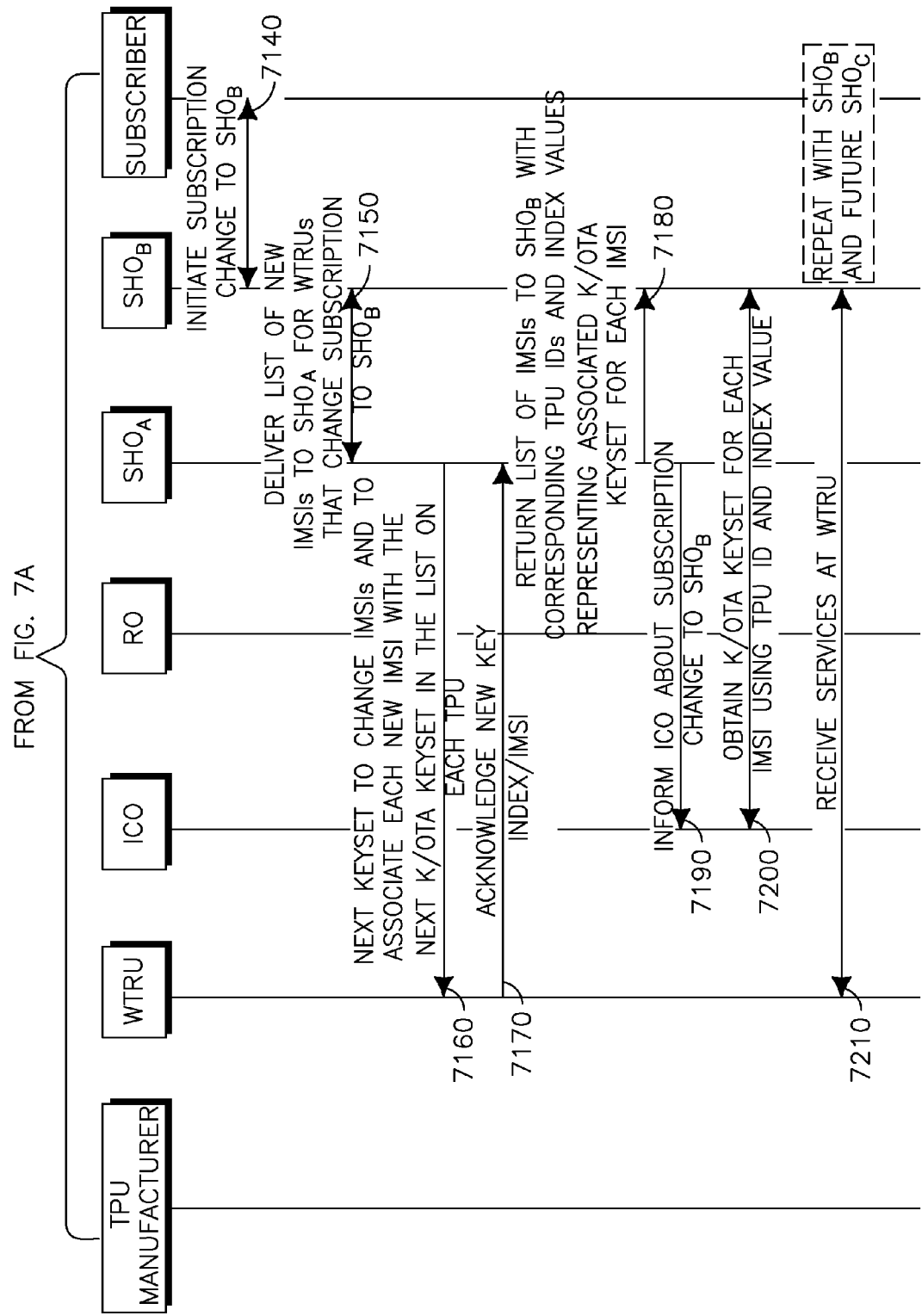

FIGS. 7A and 7B show a diagram of an example of a method for secure remote subscription provisioning with keyset protection. This method is similar to the method shown in FIGS. 4A-6B and 8A-8C except as described herein. As shown in FIGS. 4A-6B and 8A-8C, the TPU may index the keyset in response to, for example, a binary update command targeted at the IMSI. The command may be received in a message, such as a secured OTA message. FIGS. 7A and 7B show an alternative, wherein a command may be used to authorize the installation or update to an IMSI and activate a new keyset in the TPU. The WTRU, the TPU, or both may validate a security metric of the command. Optionally, the TPU may parse the IMSI data. The command may use secure messaging, such as, ISO7816 Secure Messaging. For example, the TPU may use cryptographic keys to authenticate the origin of the command, maintain the confidentiality of the command, or verify the integrity of the command. The command may provide the IMSI and may authorize the TPU to index to a new keyset. The TPU may reject a command to replace the IMSI with an IMSI that has a value that is the same as an existing IMSI. The file containing the IMSI may be a structured file.

Alternatively, the TPU may determine whether the command was included in a secure OTA message, and may reject a command that is not received via a secure OTA message. In this alternative, a local activation may be performed using a secured remote command format from a simulated OTA device.

The command may include an index of an existing keyset, an index of the new keyset, and a new IMSI value. Activation may include using the index of the new keyset. The TPU may include the index of the new keyset in the ACK message. The TPU may reject a remote activation if a current index parameter does not match a current index on the TPU. Optionally, an authorized party, such as the TPU provider, may request the index of the current keyset and a current PCID value from the TPU.

As shown in FIGS. 7A and 7B, a secure remote command, such as NEXT_KEYSET, and a file, which may be similar to an Elementary File IMSI ($EF_{IMSI}$), may be used for keyset management. The secure remote command may be also used in conjunction with the methods shown in any one of FIG. 4-6 or 8, or a combination thereof.

A subscriber, such as an equipment manufacturer or user, may select and establish a contract with an ICO, a RO, a $SHO_A$, a $SHO_B$, or a combination thereof (7010). The subscriber may register an identity of the WTRU with a RO (7020). The ICO may obtain ICO credentials, which may be used for initial network connectivity, and MNO credentials, which may be used for operational network connectivity (7030). The ICO may provide the TPU, including the credentials, to the subscriber (7040). The subscriber may install the TPU in the WTRU (7050).

The WTRU may access a network using the provisioned credentials (7060). The ICO may determine an appropriate RO (7070) using the TPU. The ICO may send a notification to the RO, for example, via IP connectivity, to indicate that the WTRU has established connection to the ICO.

The RO may identify an appropriate $SHO_A$ using, for example, a predetermined list of identifiers associated with the SHO (7080). The RO may register the WTRU with $SHO_A$ (7090). The RO may send a notification to the ICO to indicate $SHO_A$ with which the WTRU has been registered (7100).

$SHO_A$ and the ICO may exchange an IMSI for the WTRU and an operational keyset (7110). The ICO may perform an over the air (OTA) IMSI installation on the WTRU's TPU using, for example, a NEXT_KEYSET command that includes a new IMSI and an expected new index value of the keyset associated with $SHO_A$ (7120). The WTRU, the TPU, or both may validate a security metric of the command. The WTRU may terminate the initial network attachment with the ICO. The WTRU may establish an operational network attachment via $SHO_A$, or, optionally, via a visited network, and may receive services from $SHO_A$ (7130).

The subscriber may initiate a subscription change from $SHO_A$ to $SHO_B$ (7140). $SHO_B$ may send a new IMSI to the ICO (7150).

$SHO_A$ may perform an OTA IMSI update for the WTRU using, for example, a NEXT_KEYSET command that includes a new IMSI and an expected new index value of the keyset associated with $SHO_B$ (7160). The WTRU may send an ACK to $SHO_A$ indicating the update status (7170). $SHO_A$ may send a message to $SHO_B$ to indicate the association between the new IMSI and the keyset (7180).

$SHO_A$ may send a message to the ICO to inform the ICO about the subscription change (7190). $SHO_B$ may send a message to the ICO to request the keyset which is associated with the new IMSI (7200). The ICO may send the keyset and a confirmation of the IMSI-to-keyset associations to $SHO_B$. $SHO_B$ may use the IMSI and the keyset to provide connectivity services to the WTRU (7210). It should be apparent that the WTRU may change subscription to another SHO, such as $SHO_C$, using a similar method, as shown by the broken line in FIG. 7B.

Alternatively, an index associated with the new key set may be specified so as to be out of step from a sequential progression of the keysets.

Figure 8A:
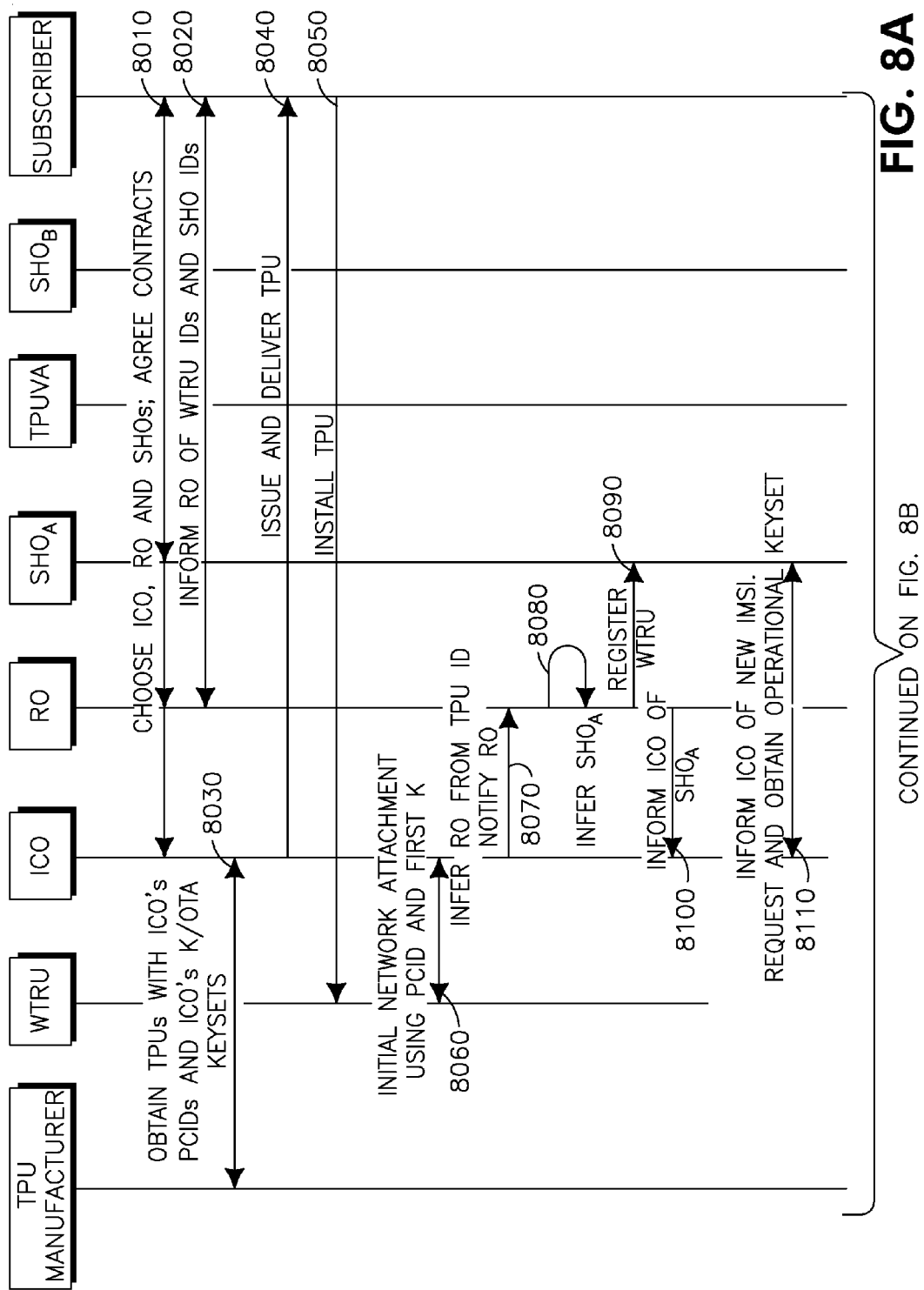
FIGS. 8A, 8B, and 8C show a diagram of an example of a method for secure remote subscription management with attestation.
Figure 8B:
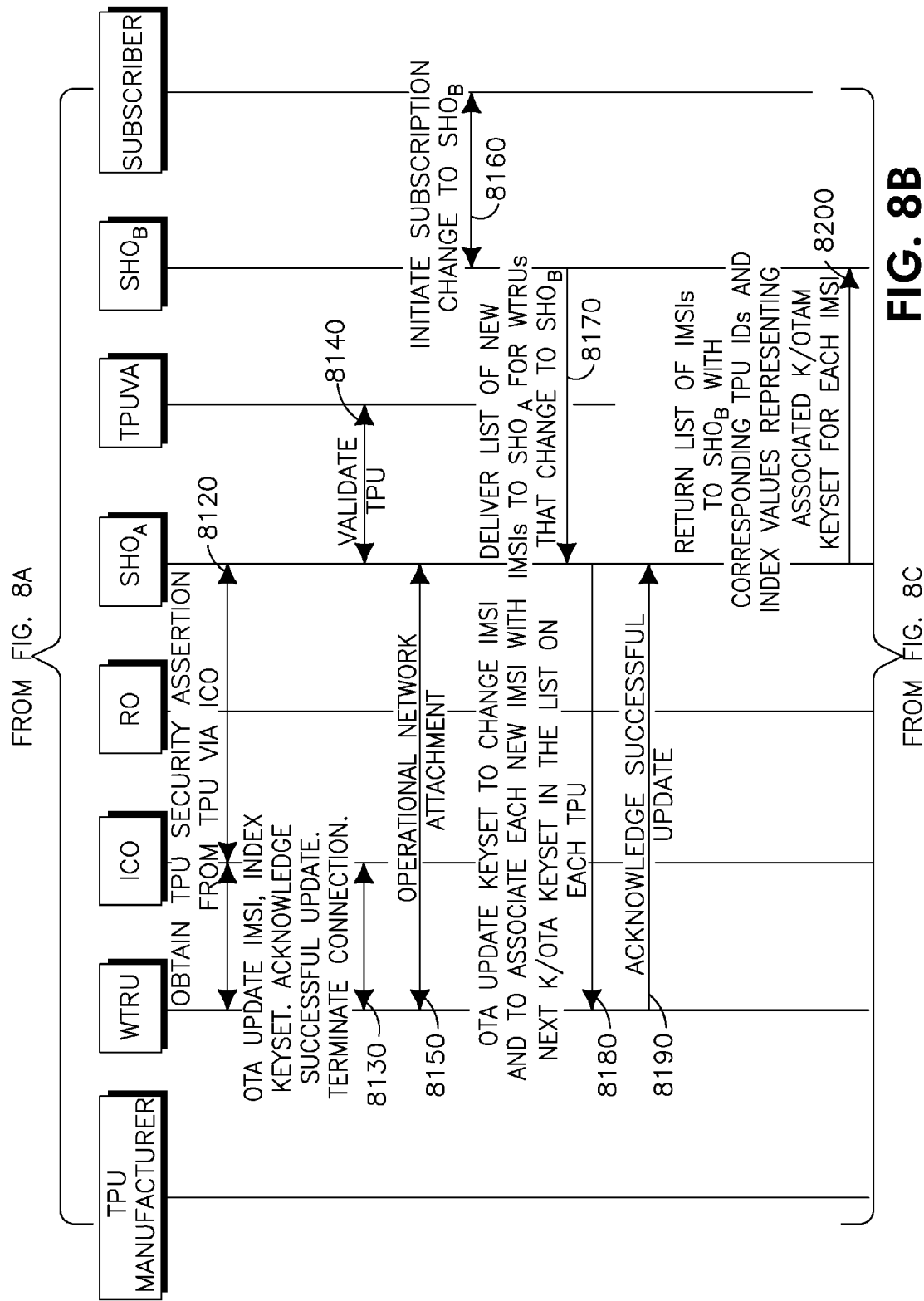
Figure 8C:
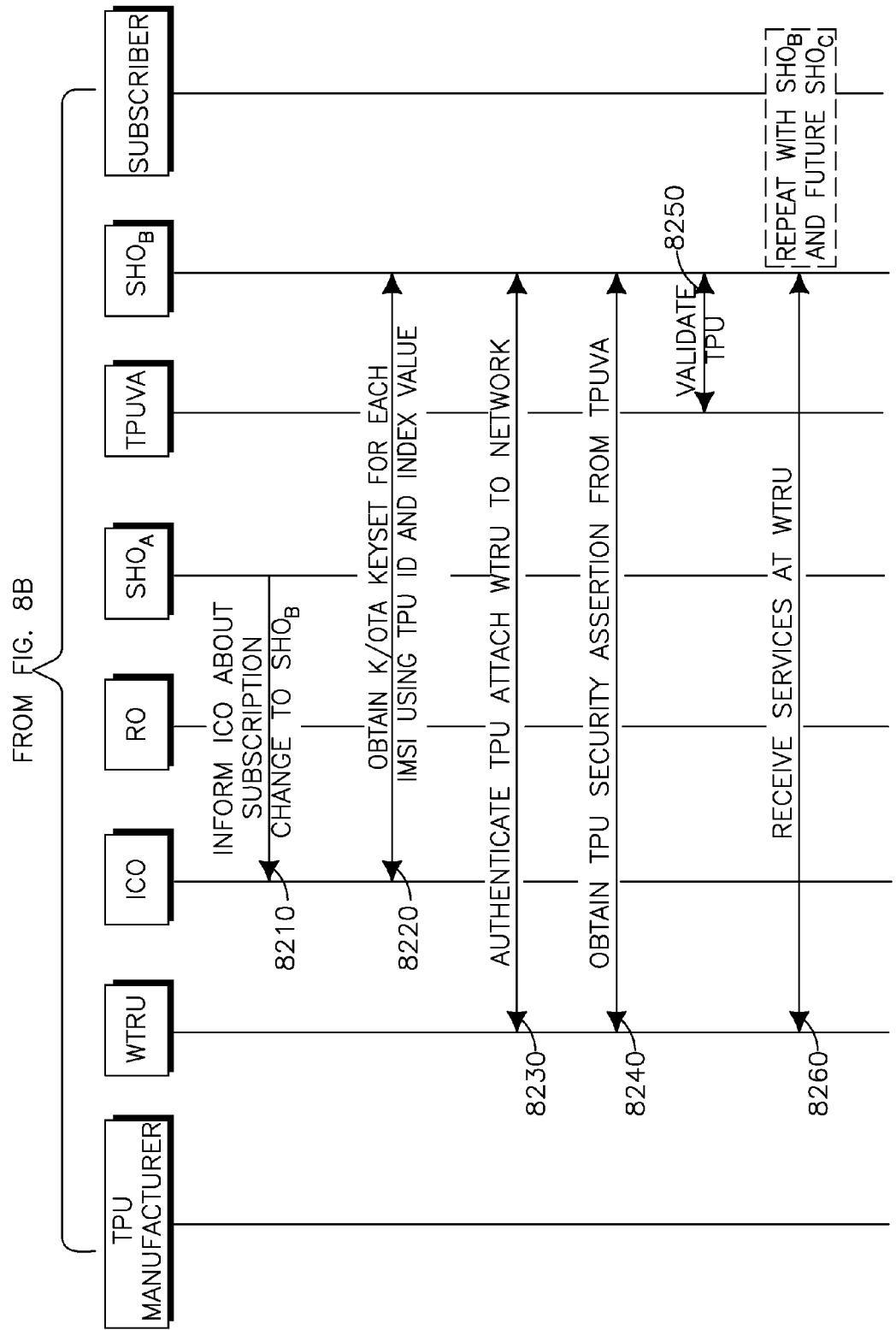

FIGS. 8A, 8B, and 8C show a diagram of an example of a method for secure remote subscription provisioning with attestation. This method is similar to the method shown in FIGS. 4A-7B, except as described herein. As shown in FIGS. 8A and 8B, the decision to allow network attachment may include an evaluation of the security of the TPU and the TPU may be security certified (trustworthy).

A subscriber, such as an equipment manufacturer or user, may select and establish a contract with an ICO, a RO, a $SHO_A$, a $SHO_B$ or a combination thereof (8010). The subscriber may register an identity of the WTRU with a RO (8020). The ICO may obtain MNO credentials (8030), for example, on a TPU. The ICO may provide a TPU, including the MNO credentials, to the subscriber (8040). The subscriber may install the TPU in the WTRU (8050).

The level of security of the TPU may be assured by the ICO, or the RO, or both, each of which may be a trusted third party (TTP) and may be a TPU Validation Authority (TPUVA). The TPU may include trust credentials, such as symmetric secret key or an asymmetric key-pair, which may be associated with a certificate that may be used for assertion of the TPU's level of security. Proof of possession of the credential may be used to attest that the TPU has been certified to have been specified, designed, implemented and manufactured under specified conditions of security. Security certification may be granted to a TPU or on a type-approval basis for a type of TPU. The certification may be carried out in compliance with a recognized certification process, thereby allowing attestation of the security of the TPU to be linked to accepted standards, such as Common Criteria (CC) security evaluation.

The trust credentials may be associated with a CC protection profile, or an evaluation certification, or both for each type of TPU. For example, the trust credentials may be associated per manufacturer, per model, or per version.

The WTRU may access a network using the provisioned credentials (8060). The ICO may determine an appropriate RO (8070) using the TPU. The ICO may send a notification to the RO, for example, via IP connectivity, to indicate that the WTRU has established connection to the ICO.

The RO may identify an appropriate $SHO_A$ using, for example, a predetermined list of identifiers associated with the SHO (8080). The RO may also register the WTRU with $SHO_A$ (8090). The RO may send a notification to the ICO to indicate $SHO_A$ with which the WTRU has been registered (8100).

$SHO_A$ and the ICO may exchange an IMSI for the WTRU and an operational keyset (8110). $SHO_A$ may receive an assertion of the trust state of the TPU from the ICO (8120).

The ICO may perform an over the air (OTA) IMSI installation on the WTRU's TPU (8120). The WTRU may terminate the initial network attachment with the ICO. A TTP, such as the TPUVA, may validate the assertion of the trust state of the TPU (8130). Validation may include verification of a digital signature and an associated certificate of an asymmetric signature key, such as an Attestation Identity Key (AIK). Validation may also include a request for a certificate validity status from a TTP and an assessment of information uniquely identifying the state of the WTRU, such as a Platform Configuration Register (PCR) value. The WTRU may establish an operational network attachment via $SHO_A$, or, optionally, via a visited network, and may receive services from $SHO_A$ (8140).

The subscriber may initiate a subscription change from $SHO_A$ to $SHO_B$ (8150). $SHO_B$ may send a new IMSI to $SHO_A$ (8160). $SHO_A$ may perform an OTA IMSI update for the WTRU (8170). The WTRU may send an ACK to $SHO_A$ indicating the update status (8180). $SHO_A$ may send a message to $SHO_B$ to indicate the association between the new IMSI and the keyset (8190).

$SHO_A$ may send a message to the ICO to inform the ICO about the subscription change (8200). $SHO_B$ may send a message to the ICO to request the keyset which is associated with the new IMSI (8210). The ICO may send the keyset and a confirmation of the IMSI-to-keyset associations to $SHO_B$.

$SHO_B$ may authenticate the TPU and may provide a network attachment to the WTRU (8220). $SHO_B$ may receive a security assertion for the TPU via the TPUVA (8230). The TPUVA, may validate the assertion of the trust state of the TPU (8240). $SHO_B$ may use the IMSI and the keyset to provide connectivity services to the WTRU (8250). It should be apparent that the WTRU may change subscription to another SHO, such as $SHO_C$, using a similar method, as shown by the broken line in FIG. 8B.

It should be apparent that the methods shown in FIGS. 4-8 may used in combination.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (WTRU), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method for use in wireless communication by a wireless transmit/receive unit (WTRU), the method comprising:
    the WTRU receiving a first keyset, a second keyset, and an initial connectivity operator identifier from a trustworthy physical unit manufacturer, wherein the first keyset and the second keyset are not a same keyset;
    the WTRU establishing a connection with an initial connectivity operator using the first keyset and the initial connectivity operator identifier;
    the WTRU receiving a first subscriber identifier from the initial connectivity operator, wherein the first subscriber identifier is associated with a first selected home operator, and wherein the first subscriber identifier is newly identified by the first selected home operator after the WTRU is registered with the first selected home operator;
    the WTRU creating an association within the WTRU, after receiving the first keyset, the second keyset, the initial connectivity operator identifier, and the first subscriber identifier, between the first subscriber identifier and the second keyset; and
    the WTRU establishing, after receiving the first keyset, the second keyset, and the initial connectivity operator identifier, an operational network attachment with the first selected home operator using the first subscriber identifier and the second keyset.

2. The method of claim 1, wherein the first keyset and the second keyset are included in a trustworthy physical unit associated with the wireless transmit/receive unit.

3. The method of claim 2, wherein the trustworthy physical unit is installed in the wireless transmit/receive unit at a time of manufacture or distribution.

4. The method of claim 1, further comprising:
    receiving a provisional connectivity identifier; and
    establishing the connection with the initial connectivity operator using the provisional connectivity identifier.

5. The method of claim 1, wherein the first keyset and the second keyset are not unique to the WTRU.

6. The method of claim 5, wherein the WTRU is distinguished from another WTRU using one of the first keyset and the second keyset by at least one of: a time or a location.

7. The method of claim 1, further comprising:
    the WTRU receiving a third keyset from the trustworthy physical unit manufacturer, wherein the first keyset, the second keyset, and the third keyset are not the same keyset;
    the WTRU receiving a second subscriber identifier from the first selected home operator, wherein the second subscriber identifier is associated with a second selected home operator, wherein the second subscriber identifier is newly identified by the second selected home operator after WTRU is registered with the second selected home operator;

the WTRU creating an association within the WTRU, after receiving the third keyset and the second subscriber identifier, between the second subscriber identifier and the third keyset; and the WTRU establishing, after receiving the third keyset, an operational network attachment with the second selected home operator using the second subscriber identifier and the third keyset.

8. The method of claim 7, wherein the first selected home operator received the second subscriber identifier from the second selected home operator.

9. The method of claim 1, further comprising determining a successful operational network attachment, wherein the successful operational network attachment indicates that a trustworthy physical unit validation authority has validated a trust state of a trustworthy physical unit.

10. The method of claim 1, wherein the first selected home operator is registered with the WTRU by a registration operator.

11. A wireless transmit/receive unit (WTRU) comprising:
a trustworthy physical unit configured to receive a first keyset, a second keyset, and an initial connectivity operator identifier from a trustworthy physical unit manufacturer;
a receiver configured to receive a first subscriber identifier from an initial connectivity operator, wherein the first subscriber identifier is associated with a first selected home operator, and wherein the first subscriber identifier is newly identified by the first selected home operator after WTRU is registered with the first selected home operator; and
a processor configured to:
establish a connection with the initial connectivity operator using the first keyset and the initial connectivity operator identifier;
associate within the WTRU, after receiving first keyset, the second keyset, the initial connectivity operator identifier, and the first subscriber identifier, the first subscriber identifier with one of the at least two keysets; and
establish, after receiving the first keyset, the second keyset, and the initial connectivity operator identifier, an operational network attachment with the first selected home operator using the first subscriber identifier and the second keyset.

12. The WTRU of claim 11, wherein the trustworthy physical unit is received from a trustworthy physical unit manufacturer.

13. The WTRU of claim 12, wherein the trustworthy physical unit is installed in the wireless transmit/receive unit at a time of manufacture or distribution.

14. The WTRU of claim 11, wherein:
the trustworthy physical unit includes a provisional connectivity identifier; and
the processor is further configured to establish the connection with the initial connectivity operator using the provisional connectivity identifier.

15. The WTRU of claim 11, wherein the first keyset and the second keyset are not unique to the WTRU.

16. The WTRU of claim 15, wherein the WTRU is distinguished from another WTRU using one of the first keyset or the second keyset by at least one of: a time or a location.

17. The WTRU of claim 11, wherein:
the receiver is further configured to:
receive a third keyset from the trustworthy physical unit manufacturer, wherein the first keyset, the second keyset, and the third keyset are not the same keyset, and
receive a second subscriber identifier from the first selected home operator, wherein the second subscriber identifier is associated with a second selected home operator, wherein the second subscriber identifier is newly identified by the second selected home operator after WTRU is registered with the second selected home operator; and
the processor is further configured to:
associate within the WTRU, after receiving the third keyset and the second subscriber identifier, the second subscriber identifier and the third keyset; and
establish, after receiving the third keyset, an operational network attachment with the second selected home operator using the second subscriber identifier and the second keyset.

18. The WTRU of claim 17, wherein the first selected home operator received the second subscriber identifier from the second selected home operator.

19. The WTRU of claim 11, wherein the processor is further configured to determine a successful operational network attachment, wherein the successful operational network attachment indicates that a trustworthy physical unit validation authority has validated a trust state of a trustworthy physical unit.

* * * * *